3,309,209
REFRACTORY
Jacques R. Martinet, San Jose, and Merton L. Van Dreser, Campbell, Calif., assignors to Kaiser Aluminum & Chemical Corporation, Oakland, Calif., a corporation of Delaware
No Drawing. Filed Aug. 26, 1963, Ser. No. 304,685
11 Claims. (Cl. 106—57)

This invention relates to refractory articles, and in a particular embodiment relates to shaped articles which have been prefired and which exhibit excellent physical properties and are especially useful in the linings of high temperature industrial furnaces.

It has long been known to make refractory linings for industrial furnaces which are intended to be operated at high temperatures, for instance, steel making or metal-melting furnaces, such linings comprising articles which are composed of magnesia, or magnesite, and chrome components. The operating conditions in such furnaces are quite severe, both as to thermal shock from changing temperatures and as to slag attack and other stresses set up in the linings. The bricks forming the lining undergo thermal shock due to the sometimes quite rapidly fluctuating temperatures, such as in recharging, scrap-loading and tapping operations. In addition to slag attack, the linings must also sustain the chemical and erosive attack of dust-bearing furnace gases. In addition, it is desired that the bricks exhibit good strength, particularly under the high temperature conditions of operation, in order to withstand stresses imposed by the weight of the charge, the weight of the furnace lining or wall itself, and the stresses and strains effected by expansion of bricks adjacent each other in such linings upon heating. More recently, in the development of the furnace lining art, it has been found that the properties of the furnace lining bricks, especially those made up of periclase and chrome or magnesite and chrome admixtures, are greatly improved by prefiring the shaped bricks to temperatures higher than the temperatures previously used in firing such bricks, whereby it has been found that there is effected direct bonding between the chrome or chromite particles and the magnesia or periclase particles, with consequent enhancement of the desirable properties of the brick. However, these firing temperatures have been quite high, i.e., above 1700° C., and have posed certain problems in the industrial preparation of these bricks, for instance, in the building of furnaces for firing such bricks and in the prevention of sticking and similar problems arising from contact of the brick products with each other and with the kiln refractories on which they are set for burning. This is to say, the operation of kilns for firing of bricks to the high temperatures necessary to effect the direct periclase-to-chrome bond has posed considerable difficulties to those skilled in this art.

According to the present invention, there is provided a novel non-fused refractory composition and a novel method for producing the so-called "high fired" periclase-chrome bricks whereby they are produced at lower temperatures than were previously required, and with obviation of some or all of the aforementioned kiln firing difficulties. There is also provided hereby a magnesia-chrome unfired refractory of excellent physical properties and which gives improved results in use upon firing in place during the operation of the metallurgical furnace in which the refractory is installed.

According to the present invention there is provided a non-fused refractory batch or composition consisting essentially of chromite, periclase and a zirconium compound in the proportions of from 10% to 90% chromite particles, from 90% to 10% periclase particles and from 0.2% to 2.0%, based on total dry weight of the batch, of a zirconium compound, expressed as $ZrO_2$. That is to say, the composition contains at least 10% chromite and at least 10% periclase. The composition is useful for forming into shapes such as bricks or blocks; or it is useful as a gunning, ramming or casting material for furnace linings. The product should contain on the fired basis not over about 5%, preferably not over 2%, of CaO.

The chromite materials employed in the present invention include natural chromite or chrome ores, which can be any refractory chromite, such as Philippine, Turkish, African, including Rhodesian and the like, Grecian or other chromite ore or beneficiated chromite ore of the type ordinarily useful in refractories in this art. Reconstituted chromite grains, which are known in this art, e.g. as shown in Seil, U.S. 2,037,600 can be substituted for natural chromite grains wholly or in part. The chromite component is crushed and sized for incorporation in the refractory mixes of the present invention, according to good practice as well-known to those skilled in this art, sizes being chosen for dense packing in the known way. In other words, the chromite ore is employed in sizes from coarse material down to, for example, that retained on 200 mesh. It is preferred that the chromite component be of particle size substantially entirely retained on 200 mesh, but it has been found operable to employ chromite containing up to 10% (of the total batch weight) particles passing through a 200 mesh screen. It is preferred for optimum results to employ chromite grains which contain not over about 2% silica, although chromite which contains up to 6% or more silica is quite useful in the present invention. In any event, however, it is preferred that the refractory composition of the present invention contain not over 6% silica on the ignited or burned basis, and for highest performance in many applications, it is preferred that the total composition contain not over 3% $SiO_2$.

The magnesia component of the grain material is dead burned magnesite or periclase or fused magnesia as commonly used in the brick making art, and it preferably contains at least 90% magnesium oxide. More refractory products and still better results are obtained with higher purity periclase, especially that containing at least 95% magnesium oxide. There can also be incorporated as magnesia-providing grain material in the present invention magnesia spinels, such as grains made up of magnesium chromite, magnesium aluminate or magnesium ferrite or mixtures of these crystals with each other, and especially such grains as contain excess periclase crystals. For intance, such grains are described in U.S. Patents 2,775,525, 2,775,526 and 2,775,527, which issued in the names of Leslie W. Austin et al. on December 25, 1956.

In making a brick or shaped article, the composition of this invention preferably contains from 10% to 60% finely divided refractory material, e.g. passing 35 mesh, including from 10% to 35%, based on the total weight of the composition, of finely divided periclase which is preferably of the same chemistry or purity as that described above. The finely divided periclase is of a size passing through a 35 mesh screen and preferably a major proportion, over 50%, thereof passes through a 100 mesh screen. In order to obtain the best results in a fired brick it is desirable that a major proportion, preferably from 60% to 80%, of the periclase passing 100 mesh pass through a 325 mesh screen.

In preparing the batches of the present invention, the composition contains a zirconium compound in an amount sufficient to provide 0.2% to 2.0%, preferably 0.5% to 1.0%, expressed as $ZrO_2$ based on the total weight of the refractory composition or batch. It is preferred that the zirconium compound substantially entirely passes through a 70 mesh screen, but better results are obtained when it substantially entirely passes through a 100 mesh screen, and optimum results when it so passes 325 mesh. Soluble zirconium compounds can be added in the form of a solution, e.g., in the tempering liquid, which is preferably water but alternatively can be alcohol (wherein zirconyl chloride is soluble), or another liquid, as desired.

A zirconium compound found very useful in the present invention is zirconium oxide, and as obtained in commerce, this material ordinarily contains at least about 90% zirconium oxide, or preferably at least 95% thereof. As obtained in commerce, the zirconia also contains a small amount of hafnium oxide, $HfO_2$, for instance, about 0.02% $HfO_2$. A typical available zirconia contains on the ignited basis 98.8% $ZrO_2$, 0.02% $HfO_2$, and the remainder, essentially oxides of Al, Ca, Cr, Fe, Mg, Si and Ti. However, zirconia of lower grade or purity is also useful, such as, for example, the concentrate of a baddeleyite ore having the following analysis: 94.3% $ZrO_2$ and $HfO_2$, 1.85% $TiO_2$, 1.3% FeO, 0.6% MgO, 0.4% CaO, 0.3% $CO_2$, 0.2% Cu, 0.11% $P_2O_5$, 0.05% $Al_2O_3$, about 0.1% $SiO_2$, 0.76% undetermined. Other zirconium compounds are useful in the invention, for example, zircon, zirconium hydroxide, zirconium tetrachloride, zirconium oxychloride, zirconium sulfate, and zirconyl chloride used singly or together. Zircon is available, for example, in the form of a concentrate of beach sands analyzing over 90% $ZrSiO_3$ and containnig a small amount of hafnium compound.

In preparing non-fused refractory articles according to the present invention, the grain material is crushed and sized according to the usual good practice in this art, to obtain dense packing in the final product. The chromite component is crushed and sized, and is useful in sizes from coarse grains down to, for example, particles substantially entirely retained on 200 mesh screen. The periclase component is crushed and sized to obtain grains of the desired size ranges also according to good practice in this art. There can be employed as periclase, for example, magnesia material preferably containing at least 90% magnesium oxide. The magnesia useful herein is a dead burned, substantially inactive nonplastic product. In other words, there is useful in this invention, periclase or dead burned magnesia. For example, one useful material is dead burned magnesia obtained by the precipitation of magnesium hydroxide from sea water or an inland brine by treatment with an alkaline preciptating agent such as calcined dolomite, with recovery of the purified, washed precipitate and firing thereof to a dead burned magnesia. Dead burned natural magnesite of suitable chemistry, e.g., preferably containing over 90% MgO and not over 3% $SiO_2$ is useful in the invention. When the coarse grain or aggregate component of the mix according to the present invention, especially that portion retained on 35 mesh, contains from 0 to 80% chromite, the composition should contain at least 10% of finely divided chromite, that is passing through a 35 mesh screen. On the other hand when the refractory batch or mix contains at least 40% of coarse grain component, the latter preferably contains from 80% to 100% chromite, and in such mix the finely divided component can consist essentially of the finely divided periclase and the zirconia as described herein. The overall batch or the fired shape should contain at least 10% of chromite.

The grain or coarse material is preferably thoroughly mixed in a mixer, such as a muller mixer, and is then mixed with the finely divided component as described herein. If desired, the periclase bonding component is ball milled to obtain a fraction passing through a 100 mesh screen; and the zirconium compound, if desired, is suitably ball milled together with the periclase to obtain an intimate admixture of these two components. Alternatively, if desired, the dry finely divided zirconium compound is added last. It will also be understood that where there is employed a zirconium compound which is soluble in water, alcohol or other tempering liquid, such zirconium compound is preferably added in solution in such liquid for best results.

When all of the dry components are in the mixer they are thoroughly blended and there is then preferably added a bonding agent or binder, soluble in the tempering liquid to be used in forming or placing in a furnace lining, especially water. The binder is suitably any cold-bonding agent known in this art, such as an aqueous solution of sulfite liquor or calcium lignin sulfonate or magnesium lignin sulfonate or mixtures of these two latter components with each other, or sodium silicate or an aqueous solution of magnesium sulfate, magnesium chloride, a soluble chromium compound, particularly chromic acid, $CrO_3$, or chromous chloride or the like or the binder or cold-bonding agent alternatively can be added in the dry state, e.g., in making bricks, and then tempering amount of water, for example, from 2% to 6% based on the total weight of the batch, is added thereto and the whole is thoroughly blended. The binder is admixed in suitable amount, e.g. from 0.5% to 3%, based on dry weight of the mix, as is usual in this art.

In making formed objects, after thorough mixing, the batch is formed into refractory bricks, blocks or desired shapes in any of the methods usual in this art. For example, the shaped articles can be formed by vibration under low pressure, by casting into molds, or by "dry" pressing in the usual brick press, suitably with the application of a pressure of at least 5000 lbs. per square inch or preferably of over 10,000 lbs. per square inch. The shaped articles are then dried or cured; and in the preferred embodiment are fired. In order to effect direct bonding of the periclase to the chromite component, the articles are fired or burned at a temperature of at least 1550° C. Firing is suitably carried out for at least one-half hour. Preferably the articles are fired at a temperature of from 1600° to 1680° C.

It is an advantage of the present invention that a composition is provided which can be formed into shape exhibiting enhanced hot modulus of rupture, and which can be fired to provide refractory articles of excellent tailoring and of high hot strength, good spalling resistance and other desirable properties, and suitable for lining furnaces subjected to high temperatures. It is a particular advantage that such articles are provided by a method which includes firing at temperatures which are easily obtainable in commercial kilns to obtain direct magnesia-to-chrome bonding; and that firing can be effected in such kilns without concomitant difficulties in the selection of supporting materials for such bricks in the firing step. In other words, it is an advantage that the bricks can be fired without general fusion to produce such bonding at temperatures which avoid sticking, deformation and other difficulties; and that the firing temperatures to achieve direct magnesia-to-chrome bonding are significantly less than those which have been known in the past as necessary to provide such direct bonding, e.g. by as much as 100° C. or more.

The following examples will illustrate some embodiments of the present invention:

EXAMPLE 1

Bricks are made up by admixing chromite grains of the following typical chemical analysis: 32.1% $Cr_2O_3$, 5.3% $SiO_2$, 30.3% $Al_2O_3$, 13.0% FeO, 1.1% CaO and 18.2% MgO. The chromite is crushed and sized to substantially all passing 35 mesh and substantially all, or 97%, retained on 200 mesh. There are also incorporated periclase grains of the following typical chemical analysis: 2.1% $SiO_2$, 1.1% $R_2O_3$ (including $Fe_2O_3$, $Al_2O_3$, $B_2O_3$, $Mn_2O_3$ and $Cr_2O_3$) 1.1% CaO, 95.7% MgO (by difference). The periclase is employed in the following grain size distribution: passing 6 mesh and retained on 14 mesh, 36.2%; passing 14 mesh and retained on 35 mesh, 8.3%; passing 65 mesh, 34.0% (including 23% passing 325 mesh), for a total of 78.5% periclase, these percentages being based on the total weight of the composition. 20% by weight of the chromite grains are admixed therewith. Periclase and chromite grains, forming batch A, are mixed dry for one minute and there is then admixed 0.75% by weight chromic acid, $CrO_3$, dissolved in water and the whole batch mixed for two minutes. There is then added 0.75% of an alkaline earth metal lignin sulfonate dissolved in sufficient water to make a total amount of water in the batch of about 2.5% and the whole is mixed for three minutes. The admixture is then pressed in a brick press under a pressure of 10,000 lbs. per square inch to form bricks (batch A) 3 inches by 4½ inches by 9 inches in dimensions. Another batch, B, is made up in exactly the same way except that the total amount of periclase added is 78% based on the total weight of the batch and there is admixed therewith 0.5% zirconia of particle size substantially entirely passing 100 mesh. This batch B is made up into bricks in exactly the same way and the densities before firing are substantially equal. The bricks of batch A and those of batch B are now burned at 1660° C. for six hours.

After firing, the bricks of batch A exhibit an average bulk density of 179.6 lbs. per cubic foot and a porosity of 19.1% by volume; whereas the bricks of batch B exhibit an average bulk density of 184.4 lbs. per cubic foot and a porosity of 16% by volume. Bricks of each batch are tested for cold crushing, hot load and hot modulus of rupture and the following average results are obtained.

Table I

|  | Cold Crushing, p.s.i. | Hot Load—Failure under 25 lbs. per Sq. Inch at ° C. | Modulus of Rupture at— | |
|---|---|---|---|---|
|  |  |  | 1,260° C., p.s.i. | 1,400° C., p.s.i. |
| Batch A | 7,500 | 1,750 | 891 | 208 |
| Batch B | 9,300 | 1,800 | 1,376 | 586 |

When examined under the petrographic microscope the fired products of batch B only exhibit direct magnesia-to-chrome bonding.

EXAMPLE 2

Another batch, C, is made up using chromite of the same description and chemical properties as in Example 1, except that it is employed in a total amount of 49.4% by weight based on the total weight of the batch and in the following grain sizes; plus 6 mesh, 13.9%; passing 6 mesh and retained on 14 mesh, 31.3%; passing 14 mesh and retained on 82 mesh, 4.2%.

There is employed periclase of the same chemical analysis as in Example 1 and of the following particle sizing: plus 20 mesh, 4.6%; passing 20 mesh and retained on 35 mesh, 7.1%; passing 35 mesh and retained on 100 mesh, 5.6%; passing 100 mesh, 31.78%, including 23.18% passing 325 mesh, to make a total amount of periclase of 49.08% based on the total weight of the batch. The periclase and chromite are mixed dry for one minute and then there is incorporated 0.77% by weight $CrO_3$ dissolved in water, and the whole mixed for two minutes, after which there is added 0.75% of an alkaline earth lignin sulfonate dissolved in water to make the total of from 2.5% to 3% by weight of water in the batch, and the whole is thoroughly blended and then formed into bricks as described in Example 1.

Another batch, D, is made up in exactly the same way except that for ¼% of the minus 100 mesh periclase there is substituted ¼% by weight of zirconia; and a third batch, E, is made up in exactly the same way except that there is substituted for ½% by weight of the minus 100 mesh periclase ½% by weight of zirconia; and in a fourth batch, F, made in exactly the same way, there is substituted for 1% by weight of the minus 100 mesh periclase 1% by weight of zirconia, these percentages being based on the total weight of the batch. The zirconia is added in particle sizes passing 70 mesh, 90% thereof passing 100 mesh. Each batch is formed into bricks in the same manner as in Example 1 and the bricks are burned at 1620° C. for six hours. Representative bricks of each batch are then tested for modulus of rupture at 1260° C., with the results shown in Table II:

Table II

|  | Modulus of Rupture at 1260° C., p.s.i. |
|---|---|
| Batch C (No $ZrO_2$) | 950 |
| Batch D (¼% $ZrO_2$) | 1729 |
| Batch E (½% $ZrO_2$) | 2542 |
| Batch F (1% $ZrO_2$) | 2543 |

The modulus of rupture of batch D brick at 1260° C., after merely drying at 150° C., was 64% greater than that of batch C brick.

In a preferred embodiment of the invention in the production of shaped refractories such as bricks, it is advantageous to admix chromite or magnesia grain material or an admixture of such grains or aggregate with from 20% to 60% of a finely divided bonding component, i.e., passing through a 35 mesh screen, and consisting essentially of from 0% to 40% chromite, 20% to 35% periclase, and from 0.2% to 2.0% of the zirconium compound herein described, based on total weight of the batch. That is to say, in addition to the zirconium compound and periclase, the remainder of the bonding component, if any is chromite. The composition and the article made therefrom contains at least 10% chromite based on the total weight of the product, and it can be present as either coarse or finely divided material. The zirconium compound, preferably zirconia, is in intimate and uniform admixture with the other bonding components, and the batch is mixed, shaped and fired as described above. After firing at a temperature of at least 1550° C., especially at from 1550° C. to 1700° C., the fired shape exhibits direct magnesia-to-chrome bonding, and very good strength. It is preferred that the compositions be fired for at least about one hour.

The refractories made according to this invention are useful in forming the linings of open hearth steel furnaces, electric steel furnaces, oxygen converters wherein steel is made, the hot zones of rotary cement kilns, glass furnace regenerator crowns, copper converters and other high temperature furnaces. The zirconium compound is as added and is not such compound as may be present as an impurity in the other components of the mix. It is present in the composition in substantially uniform dispersion, especially in the finely divided or bond-forming portion of a batch. Such uniform and intimate dispersion can be effected by admixing dry finely divided zirconium compound as described above, or it can be effected by adding as a solution or dispersion in a tempering liquid such as water, for instance.

In this specification and claims, in conformity with common practice in reporting chemical analyses of refractory materials, the proportions of the various chemical constituents present in a material or composition are given as though these constituents were present as the simple oxides. Thus, the magnesium constituent referred to as magnesium oxide or MgO and the silicon, as silica or $SiO_2$, although the silica may be present in combination with a small amount of the magnesia or with another constituent of the mix. For instance, the term "2.0% expressed as $ZrO_2$" or "2.0% $ZrO_2$" is intended to mean that a chemical analysis of the material referred to would show the zirconium content as 2.0% expressed as zirconium dioxide although it might all be present in some other combined form. All parts and percentages herein are by weight unless otherwise indicated, porosities for instance being by volume. The mesh sizes are those of Tyler mesh, as shown in Chemical Engineers' Handbook, John H. Perry, Editor-in-Chief, published by McGraw-Hill Book Co., third edition, 1950, e.g., 35 mesh having an opening of 0.417 mm., 70 mesh of 0.185 mm., 100 mesh of 0.147 mm., 200 mesh of 0.074 mm., and 325 mesh of 0.043 mm. The modulus of rupture is determined according to A.S.T.M. Standards, Designation C133-55, except that the specimens are tested in a furnace which maintains them at a temperature of 1260° C. or as indicated.

Having now described the invention, what is claimed is:

1. A refractory composition adapted to form the lining of a high temperature metallurgical furnace, consisting essentially of at least one refractory grain material chosen from the group consisting of chromite, magnesia and magnesia spinel, and from 20% to 60% of a refractory bonding component substantially entirely passing 35 mesh screen, said bonding component including from 10% to 35% of periclase particles, said bonding component including in intimate dispersion a zirconium compound in amount sufficient to provide from 0.2 to 2.0% $ZrO_2$ based on the total weight of the refractory composition, the remainder of said bonding component being chromite, said refractory composition containing at least 10% chromite and not over 6 percent silica and not over 2 percent CaO.

2. Composition as in claim 1 containing from 0.5% to 1.0% zirconia.

3. A refractory shaped article adapted to form the lining of a high temperature metallurgical furnace, consisting essentially of at least one refractory grain material chosen from the group consisting of chromite, magnesia and magnesia spinel, and from 20% to 60% of a refractory bonding component substantially entirely passing 35 mesh screen, said bonding component including from 10% to 35% of periclase particles and in intimate dispersion a zirconium compound in amount sufficient to provide from 0.2 to 2.0% $ZrO_2$ based on the total weight of said article, the remainder of said bonding component being chromite, said article containing at least 10% chromite.

4. A fired refractory shaped article adapted to form the lining of a high temperature metallurgical furnace, consisting essentially of at least one refractory grain material selected from the group consisting of chromite, magnesia and magnesia spinel, and from 20% to 60% of a refractory bonding component substantially entirely passing 35 mesh, including at least 10% periclase of said bond component passing 35 mesh, said bonding component including from 0.2% to 2.0% expressed as $ZrO_2$, based on the total weight of the refractory article, of zirconium compound, said article containing at least 10% chromite.

5. Article as in claim 4 wherein said zirconium compound is zirconia.

6. Article as in claim 4 containing from 0.5% to 1.0% zirconia.

7. A fired, shaped, refractory article adapted to form the lining of a high temperature metallurgical furnace, consisting essentially of a refractory grain component substantially all retained on 35 mesh and consisting of from 10% to 90% chromite and from 90% to 10% periclase, and from 20% to 60% of a refractory bonding component substantially entirely passing a 35 mesh screen and including at least 10% periclase particles, said bonding component containing from 0.2% to 2.0% $ZrO_2$ based on the total weight of the refractory article, the remainder of said bonding component being chromite, said article being characterized by direct bonding of periclase to chromite particles.

8. A fired refractory composition consisting essentially of a refractory grain component substantially entirely retained on 35 mesh and consisting of from 10% to 90% chromite and from 90% to 10% periclase, and from 20% to 60% of a refractory bonding component substantially entirely passing 35 mesh and including at least 10% periclase particles, said bonding component containing from 0.2% to 2.0%, based on the total weight of the composition, of zirconia, the remainder of said bonding component being chromite, said composition being characterized by direct bonding of periclase to chromite particles and containing not over 6 percent silica and not over 2 percent CaO.

9. An unfired refractory shaped article adapted to line a high temperature metallurgical furnace, consisting essentially of at least one refractory grain material chosen from the group consisting of magnesia, magnesia spinel and chromite, and from 20% to 60% of a refractory bonding component substantially entirely passing 35 mesh screen and containing at least 10% periclase particles, said bonding component containing from 0.2% to 2.0% $ZrO_2$, based on the total weight of the refractory batch, the remainder of said bonding component being chromite, said article containing at least 10% chromite.

10. Process for making a shaped refractory article consisting essentially of chromite and magnesia particles, at least a portion of said particles being directly bonded to each other, which consists essentially of admixing at least 10% chromite particles and at least 10% periclase particles, a binder, and from 0.2% to 2.0% of a zirconium compound, all in intimate interdispersion, forming said admixture into a shape, and firing at a temperature of from 1550° C. to 1725° C.

11. Process for making a refractory product consisting essentially of chromite and magnesia particles, at least a portion of said particles being directly bonded to each other, which consists essentially of intimately admixing at least 10% chromite particles, at least 10% magnesia particles, from 10% to 35% of said magnesia particles passing 35 mesh, and intimately interdispersing therewith from 0.2% to 2.0% of a zirconium compound forming into shape, and firing at a temperature of at least 1550° C.

References Cited by the Examiner
UNITED STATES PATENTS

| | | | |
|---|---|---|---|
| 3,036,925 | 5/1962 | Heuer | 106—59 |
| 2,537,013 | 1/1951 | Austin et al. | 106—57 |
| 2,984,576 | 5/1961 | Alexander et al. | 106—57 |
| 3,036,925 | 5/1962 | Heuer | 106—59 |

TOBIAS E. LEVOW, *Primary Examiner.*

J. E. POER, *Assistant Examiner.*